(12) United States Patent
Thakkar et al.

(10) Patent No.: US 12,204,576 B2
(45) Date of Patent: Jan. 21, 2025

(54) AUTOMATIC SUB-CLUSTER SELECTION ALGORITHM FOR THE HIERARCHICAL CLUSTERING OF FILE OBJECTS

(71) Applicant: Dell Products L.P., Round Rock, TX (US)

(72) Inventors: Smriti Thakkar, San Jose, CA (US); Tony T. Wong, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/813,219

(22) Filed: Jul. 18, 2022

(65) Prior Publication Data
US 2024/0020329 A1    Jan. 18, 2024

(51) Int. Cl.
*G06F 16/35*    (2019.01)
(52) U.S. Cl.
CPC .................................. *G06F 16/355* (2019.01)
(58) Field of Classification Search
None
See application file for complete search history.

(56) References Cited

U.S. PATENT DOCUMENTS

| | | | | |
|---|---|---|---|---|
| 8,285,658 | B1 * | 10/2012 | Kellas-Dicks | G06F 21/316 706/45 |
| 2014/0317019 | A1 * | 10/2014 | Papenbrock | G06Q 40/06 705/36 R |
| 2020/0043022 | A1 * | 2/2020 | Karmakar | G06F 16/322 |

OTHER PUBLICATIONS

Hu, Minhui, et al., "Threshold-Based Hierarchical Clustering for Person Re-Identification", published Apr. 24, 2021, MDPI Entropy 23 , 522, 14 pages. (Year: 2021).*

(Continued)

*Primary Examiner* — Scott A. Waldron
(74) *Attorney, Agent, or Firm* — Workman Nydegger

(57) ABSTRACT

One example method includes, beginning at a parent node of a data structure, calculating a first W-index for the parent node and a left child node, calculating a second W-index for the parent node and a right child node, when the first W-index exceeds a threshold λ, marking the left child node as a candidate to be included in a sub-cluster separate from a sub-cluster that includes the parent node, when the second W-index exceeds the threshold λ, marking the right child node as a candidate to be included in a sub-cluster separate from the sub-cluster that includes the parent node, and recursively calculating respective W-indices for all other parent nodes in the data structure until all child nodes of the data structure have been assigned to a sub-cluster.

20 Claims, 14 Drawing Sheets

(56) References Cited

OTHER PUBLICATIONS

Zhou, Shibing, et al., "Method for Determining the Optimal Number of Clusters Based on Agglomerative Hierarchical Clustering", IEEE Transactions on Neural Networks and Learning Systems, vol. 28, No. 12, Dec. 2017, pp. 3007-3017. (Year: 2017).*
U.S. Appl. No. 17/125,536, titled "Efficient Dictionary Data Structure to Find Similar Backup Clients," filed Dec. 17, 2020.
U.S. Appl. No. 17/023,997, titled, "Post-Processing Global Deduplication Algorithm for Scaled-Out Deduplication File System", filed Sep. 17, 2020.
U.S. Appl. No. 17/506,302, titled, "Estimating Data File Union Sizes Using Minhash", filed Oct. 20, 2021.
U.S. Appl. No. 17/405,272, titled, "Optimal Cluster Selection in Hierarchical Clustering of Files", filed Aug. 18, 2021.
MinHash Wikipedia, https://en.wikipedia.org/wiki/MinHash, June 12, 2022
Ryan P. Adams "Hierarchical Clustering", COS 324—Elements of Machine Learning, Princeton University.

* cited by examiner

Start singleton file objects = [1][2][3][4][5][6][7][8][9][10][11][12][13][14][15]

Cluster Iterations: Distance: Clusters Formed: W-Index

1st Iteration: D1 = 0.03 Cluster = [1]][2][3][4][5][6][7][8][9][10][11][12][13][14][15] W1 = 0.05/0.03 = 1.6
2nd Iteration: D2 = 0.05 Cluster = [1,2][3][4][5][6][7,8][9][10][11][12][13][14][15] W2 = 0.07/0.05 = 1.4
3rd Iteration: D3 = 0.07 Cluster = [1,2][3][4,5][6][7,8][9][10][11][12][13][14][15] W3 = 0.10/0.07 = 1.42
4th Iteration: D4 = 0.10 Cluster = [1,2,3][4,5][6][7,8][9][10][11][12][13][14][15] W4 = 0.11/0.10 = 1.1
5th Iteration: D5 = 0.11 Cluster = [1,2,3][4,5][6][7,8][9][10][11][12,13][14][15] W5 = 0.13/0.11 = 1.3
6th Iteration: D6 = 0.13 Cluster = [1,2,3][4,5][6][7,8][9][10,11][12,13][14][15] W6 = 0.16/0.13 = 1.23
7th Iteration: D7 = 0.16 Cluster = [1,2,3][4,5][6][7,8,9][10,11][12,13][14][15] W7 = 0.19/0.16 = 1.18
8th Iteration: D8 = 0.19 Cluster = [1,2,3][4,5][6][7,8,9][10,11,12,13][14][15] W8 = 0.23/0.19=1.21
9th Iteration: D9 = 0.23 Cluster = [1,2,3][4,5,6][7,8,9][10,11,12,13][14][15] W9 = 0.46/0.23 = 2 <= W-index
10th Iteration: D10 = 0.46 Cluster = [1,2,3][4,5,6][7,8,9][10,11,12,13][14,15] W10 = 0.49/0.46 = 1.06
11th Iteration: D11 = 0.49 Cluster = [1,2,3,4,5,6][7,8,9][10,11,12,13][14,15] W11 = 0.54/0.49 = 1.10
12th Iteration: D12 = 0.54 Cluster = [1,2,3,4,5,6][7,8,9][10,11,12,13,14,15] W12 = 0.83/0.54 = 1.53
13th Iteration: D13 = 0.83 Cluster = [1,2,3,4,5,6,7,8,9][10,11,12,13,14,15] W13 = 0.97/0.83 = 1.16
14th Iteration: D14 = 0.97 Cluster = [1,2,3,4,5,6,7,8,910,11,12,13,14,15]

FIG. 11

AUTOMATIC SUB-CLUSTER SELECTION ALGORITHM FOR THE HIERARCHICAL CLUSTERING OF FILE OBJECTS

FIELD OF THE INVENTION

Embodiments of the present invention generally relate to data deduplication. More particularly, at least some embodiments of the invention relate to systems, hardware, software, computer-readable media, and methods, for identifying, and clustering, similar file objects for deduplication.

BACKGROUND

In some data protection architectures, such as the DellEMC Data Domain Global scale architecture, multiple nodes in the cluster share a global namespace. Backup clients back up their data to Mtree data structures which are logical collections of files within a single node. The Mtrees are assigned to a specific node on creation.

With architectures such as these, data deduplication, or simply 'deduplication,' occurs within a single node. Data is not shared across nodes. If two Mtrees on different nodes are similar, those Mtrees cannot share their common data. Compared to a super single node server, the global scale architecture cannot deliver the same level of data deduplication.

One technique to improve global deduplication is the hierarchical clustering algorithm. The algorithm produces a detailed hierarchical dendrogram. Usually, one can identify the obvious groups of similar objects, Mtrees, visually. However, there are some algorithms like predefined distance threshold, number of clusters, max-gap, Dunn's index, W-index that can automatically analyze the dendrogram and can pick a solution. All these techniques leverage the information available about the consecutive merge levels in the hierarchical dendrogram to make this decision, which results in a global solution at a particular height/similarity level in the dendrogram.

However, all of the aforementioned approaches suffer a common problem. That is, the selection of a cluster is based on a global condition and cuts off the dendrogram at a single similarity level either by visual inspection, such as a predefined threshold or number of clusters required, or automatically such as through the use of a maximum gap or W-index evaluation. Thus, these approaches neither enable, nor implement, the identification and use of sub-clusters of similar file objects.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 11 discloses an example of W-index calculation for a group of clustering iterations.

DETAILED DESCRIPTION OF SOME EXAMPLE EMBODIMENTS

Figure 1:
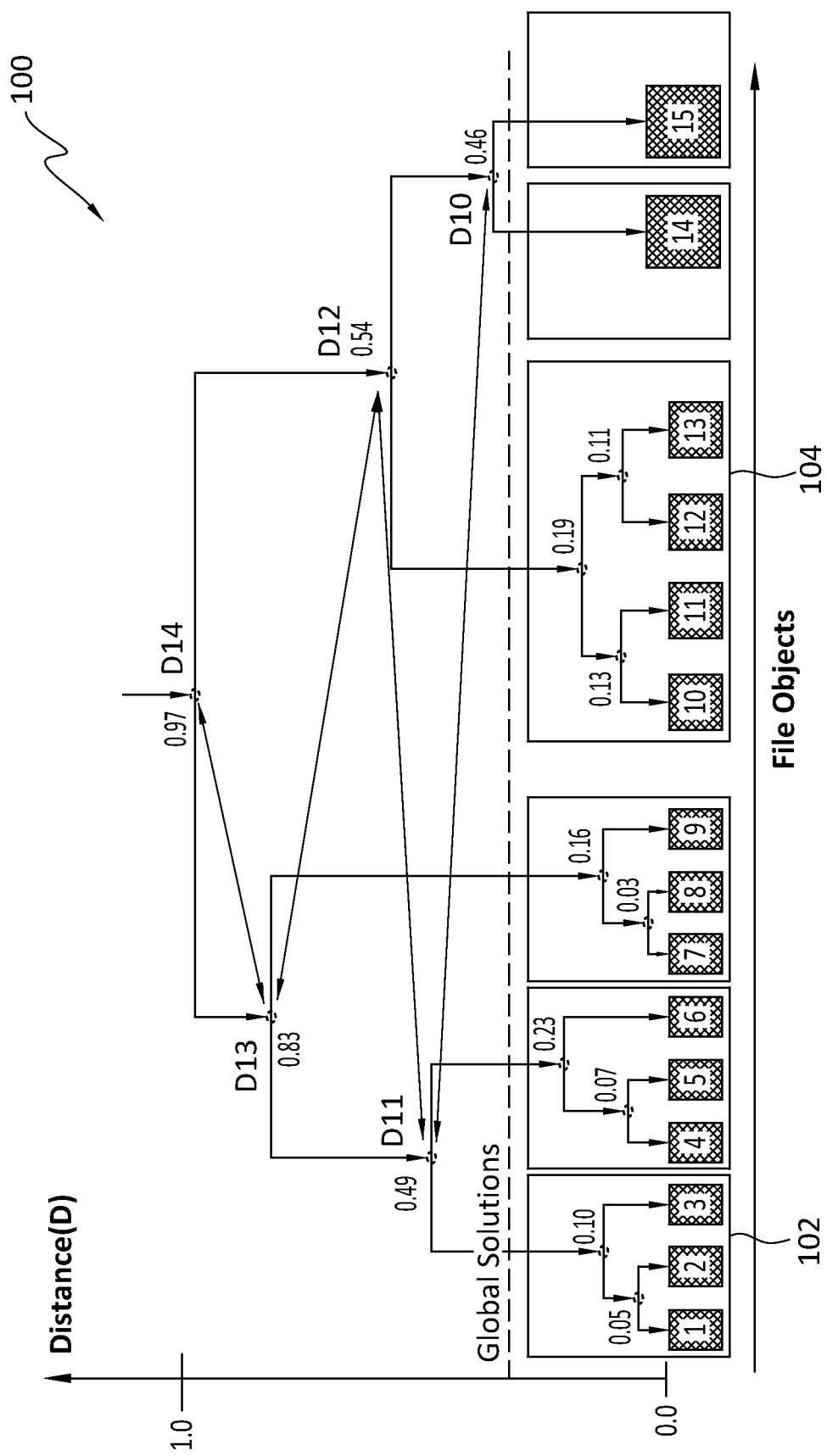
FIG. 1 discloses a global approach for selecting sub-clusters.

Embodiments of the present invention generally relate to data deduplication. More particularly, at least some embodiments of the invention relate to systems, hardware, software, computer-readable media, and methods, for identifying, and clustering, similar file objects for deduplication.

In general, some example embodiments of the invention are directed to methods for sub-cluster identification, possibly visually from a dendrogram, and selection. In this way, a group of file objects need not be deduplicated globally as a whole, but may be broken into sub-clusters of suitably similar file objects for improved data deduplication performance at a lower, or more granular, level in the group. Thus, embodiments may implement an approach that is global in that it deals with all the file objects in a group, but is implemented at a granular level for each of various identified sub-clusters within that group.

One example embodiment comprises an algorithm that may implement a top down approach to sub-cluster identification and selection. This top-down approach may be implemented in relation to an object. Example objects include, but are not limited to, one or more files, a directory, a sub-directory, or a filesystem such as an Mtree. Such an Mtree filesystem may contain, for example, directories and files. Some filesystems, such as the Dell Data Domain File System (DDFS), may contain any number of Mtrees. Thus, at least some example embodiments may operate to compute, or otherwise determine, similarities among a collection of Mtrees in a filesystem such as DDFS. This use case is noted only by way of example however, and is not intended to limit the scope of the invention in any way. In example embodiments, and as discussed in further detail elsewhere herein, various groupings of data, such as a file, a union of files, or a subdirectory, for example, may be represented as a set of fingerprints.

Thus, embodiments of the method may operate on one or more Mtrees, starting from a root node of an Mtree and progressing down to the leaf child nodes of the Mtree. This approach may result in multiple solutions at different levels on different branches of a dendrogram which, in turn, may enable an application to select the sub-clusters based on its selection criteria. If the root is, itself, an Mtree, the root may contain only files or directories. In that case, example embodiments may evaluate any similarities among files, or among directories.

In more detail, an embodiment may, in an Mtree, compare information available on the parent node with its left child and right child, at every node, to make a clustering decision, rather than at consecutive merge levels. Thus, example embodiments may be applied independently to the branches of the Mtree. With this information, similar Mtrees may be grouped together, which may involve moving Mtrees around to/from different locations, to define more cohesive file object sub-clusters by choosing solutions at various heights/similarity levels in the dendrogram. These results, that is, the identification of the sub-clusters by example embodiments, may be used for data management, global deduplication, and capacity balancing, among other things.

Note then that embodiments may group together similar files, or similar sub-directories, or similar Mtrees, for example. Thus, the scope of the invention is not limited to methods for the clustering of similar Mtrees.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may identify, over the entire hierarchical structure of a single Mtree, one or more sub-clusters of similar file objects. An embodiment may optimally identify sub-clusters based on application specific parameters such as data movement cost, data deduplication savings at the destination, and available space on the data storage destination. An embodiment may enable the performance of data analysis on similar file objects contained in a sub-cluster. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. General Aspects of Example Operating Environments

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, 10 replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment, such as Dell EMC Data Domain for example, that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Overview

Reference is made herein to dendrograms, which may be used to show a hierarchical relation between file objects. In general, a dendrogram may be used to aid in the clustering together of similar file objects. The height, in the dendrogram, at which two objects are joined or clustered together may be used as an indication as to the relatively similarity of those objects to each other. Thus, if the height of a link between two objects is small, it may be inferred that those two objects are relatively similar to each other while, on the other hand, if the height of a link between two objects is large, it may be inferred that those two objects are not particularly similar to each other. Thus, a dendrogram may provide a visual indication as to the relative similarity/dissimilarity of various objects with respect to each other.

One technique to improve global deduplication is the use of a hierarchical clustering algorithm which may be used to produce a detailed hierarchical dendrogram. Some algorithms may be used to automatically analyze the dendrogram and pick a file object clustering solution. Such algorithms include, for example, predefined distance threshold, number of clusters, max-gap, Dunn index, and W-index. Such techniques may leverage information available about the consecutive merge levels in the hierarchical dendrogram to make this clustering decision, which may result in a global solution at a particular height/similarity level in the dendrogram.

By way of illustration, and with reference now to an example dendrogram 100 in FIG. 1, it can be seen that the prior max-gap and W-index method compares distances of clusters formed at consecutive levels in a bottom up approach, starting from leaf nodes and progressing up to the root node. As shown in FIG. 1, these algorithms compare, as shown by the arrows, D1 with D2, D2 with D3 ... D10 with D11, D11 with D12, D12 with D13, and D13 with D14, and then make a decision based on selection criteria, and lists the sub-clusters selected. This approach results in a single global solution, denoted by the broken line in FIG. 1. Note that the 'D' values, or distances, shown on the Y-axis range from 0 (two file objects are duplicates of each other) to 1 (two file objects contain no common data and are completely dissimilar to each other).

That is, even though the similarity of file objects within a cluster may vary from one cluster to another, such as from cluster 102 (similarity 0.1) to cluster 104 (similarity 0.19), the selection is based on a global condition and cuts off the dendrogram 100 at a single similarity level, approximately 0.25 in FIG. 1. Among other things, this global solution fails to account for similarity differences between clusters.

Figure 2:
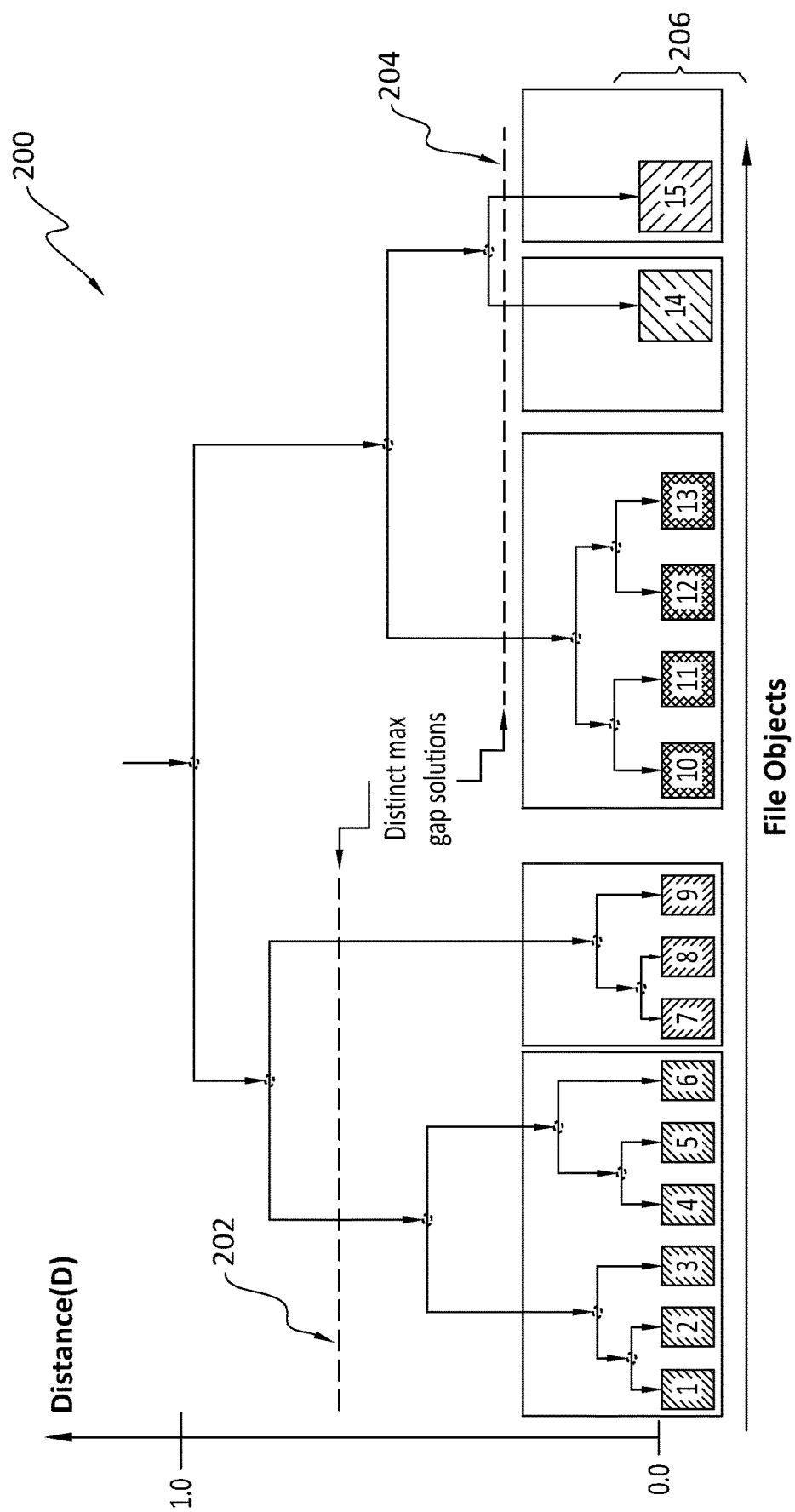
FIG. 2 discloses a dendrogram showing two distinct clustering solutions.

The dendrogram 200 in FIG. 2 illustrates another shortcoming of algorithms such as those noted above. Particularly, the dendrogram 200 discloses two distinct branches 202, and 204, in the hierarchy. If the maximum gap criteria is used for clustering the file objects 206, that maximum gap criteria will not be able to produce any satisfactory solution for both branches 202 and 204, since their respective maximum gap is achieved at different distances 'D,' or similarity levels.

Given considerations such as those noted in the discussion of FIGS. 1 and 2, at least some example embodiments are directed to an algorithm for sub-cluster selection. For example, FIG. 3 discloses an approach, according to some embodiments, that uses left and right child information to select sub-clusters. This top-down approach may start from a root node to the leaf child nodes, which opposite to the bottom-up approach indicated in FIGS. 1 and 2.

Figure 3:
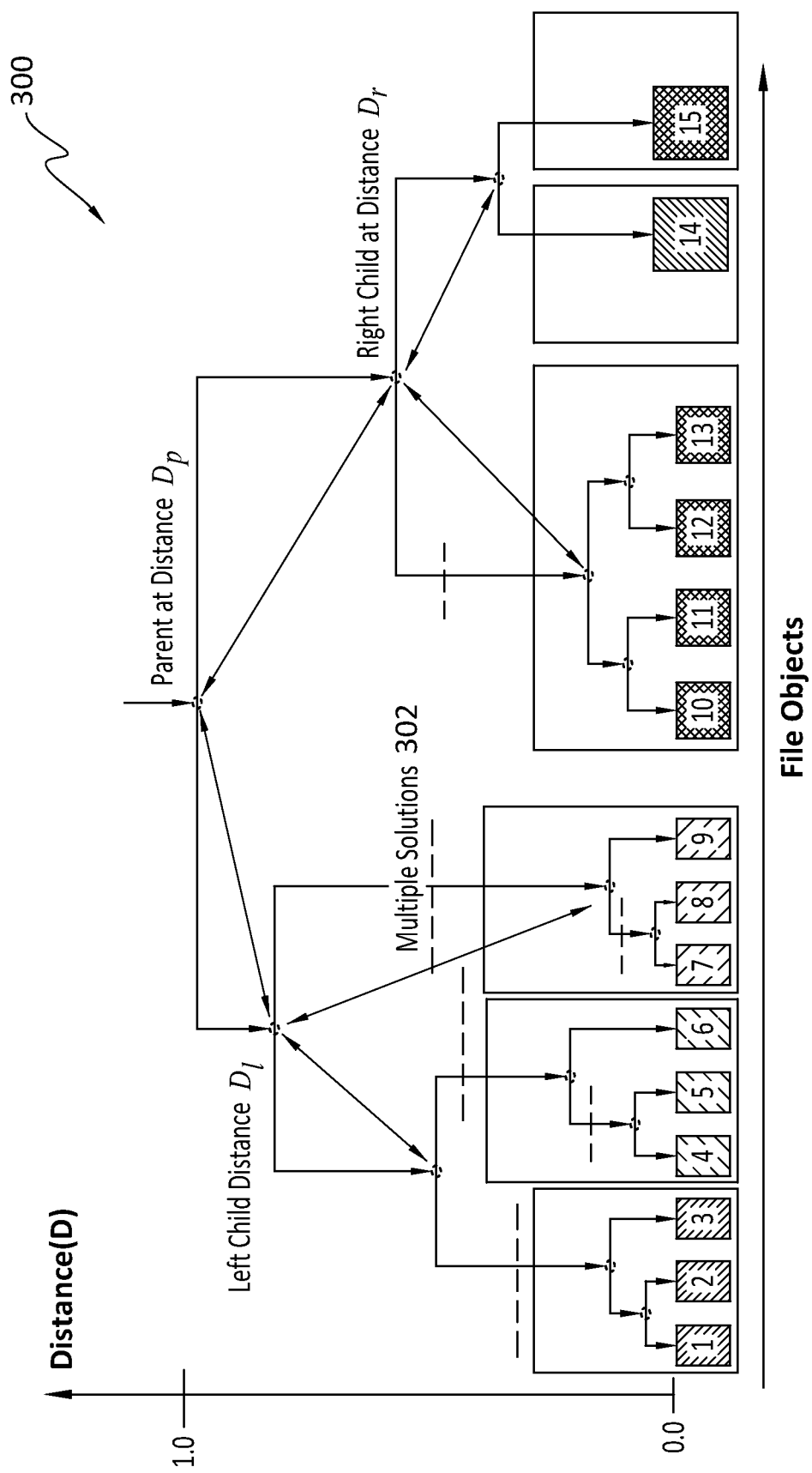
FIG. 3 discloses an algorithm that uses left and right child information to select sub-clusters, according to some example embodiments.

In general, the top-down approach exemplified in FIG. 3 may result in multiple different solutions at different levels, and on different branches, of the dendrogram 300. Thus, an application may select a particular solution, which may comprise one or more of the sub-clusters, based on the selection criteria that guides the application. Note that the solution that is selected may vary from one application, or user, to another. Such selection criteria may comprise, for example, a minimum similarity requirement for file objects in a sub-cluster. Another selection criterion may comprise a requirement for a minimum number of file objects in a sub-cluster, and/or a particular type of file object, such as a data file for example, in a sub cluster. Example applications may include, but are not limited to, SQL, and deduplication applications.

In more detail, an example implementation of a top-down algorithm according to some embodiments, the algorithm may operate, beginning at the root or 'parent' node of an Mtree, to compare information available on the parent node with its left child node and right child node. For example, and with reference to FIG. 3, the algorithm may compare $D_p$ with $D_l$ (left child distance) and $D_p$ with $D_r$ (right child distance) at every node to make a decision. In the example of FIG. 3, it can be seen that the distance 'D' between the parent and the left child is less than the distance between the parent and the right child. In this way, the algorithm may be applied independently to the branches of the dendrogram 300 to select more cohesive clusters by choosing among different solutions 302 at various heights 'D'/similarity levels in the dendrogram 300, as indicated by the different broken lines in FIG. 3. These results may be used for data management, global deduplication, and capacity balancing. Note that the approach reflected in FIG. 3 stands in contrast with approaches that employ consecutive merge levels in which nodes/clusters are progressively merged together in a bottom-up approach, as in the examples of FIGS. 1 and 2.

C. Detailed Aspects of Some Example Embodiments

C.1 Jaccard Similarity, Hierarchical Clustering Algorithm, and Dendrogram

In general, example embodiments may employ Jaccard similarity, hierarchical clustering algorithms, and dendrograms, in the definition of algorithms, and the application of those algorithms to file objects, where the file objects may be backed up in an Mtree or other data structure. In general, a typical hierarchical clustering (HC) algorithm, which may operate in a bottom-up fashion, serves to identify groups of similar files. However, the HC algorithm may not necessarily choose a "best" solution. Rather, for N file objects for example, the HC algorithm may simply produce a hierarchy of N−1 clusters, or groups, of file objects that may be clustered together based on their similarity to each other.

This HC algorithm may begin with a given number N of file objects as N clusters, that is, each file object may be, initially at least, a cluster unto itself. The HC algorithm may then combine the most 2 similar objects, such as file objects 1 and 2 for example, to form N−1 clusters. That is, because each object is initially its own cluster, the combination of two objects together to form a single new cluster will reduce the total number of clusters N, by 1, that is, after the first iteration of the HC algorithm, the number of clusters will be N−1. The HC algorithm may then repeat this process iteratively to produce N, N−1, N−2, . . . 1 clusters at, respectively, iteration 0, 1, 2, . . . N−1 as shown in the dendrogram 400 in FIG. 4, where the number of file objects is N=15.

Note that in the case of file objects, or 'files,' each file is a collection of data segments. In a deduplication file system, each segment may be identified by a SHA1 (Secure Hash Algorithm 1) fingerprint and therefore a file may be viewed as a collection of these SHA1 fingerprints. There is no equivalent distance function between 2 given fingerprints. That is, fingerprints are either the same, or different. However, the relative similarity between two files may be defined as the Jaccard coefficient $J(X,Y)=|X \cap Y|/|X \cup Y|$, where: $|X \cap Y|$ is the count of fingerprints common between X and Y; and, $|X \cup Y|$ is the union count of all unique fingerprints of X and Y. Thus, if there are 5 fingerprints common to X and Y, and there are 20 total unique fingerprints in X and Y combined, the Jaccard coefficient $J(X,Y)$ would be 5/20, or 0.25.

Figure 4:
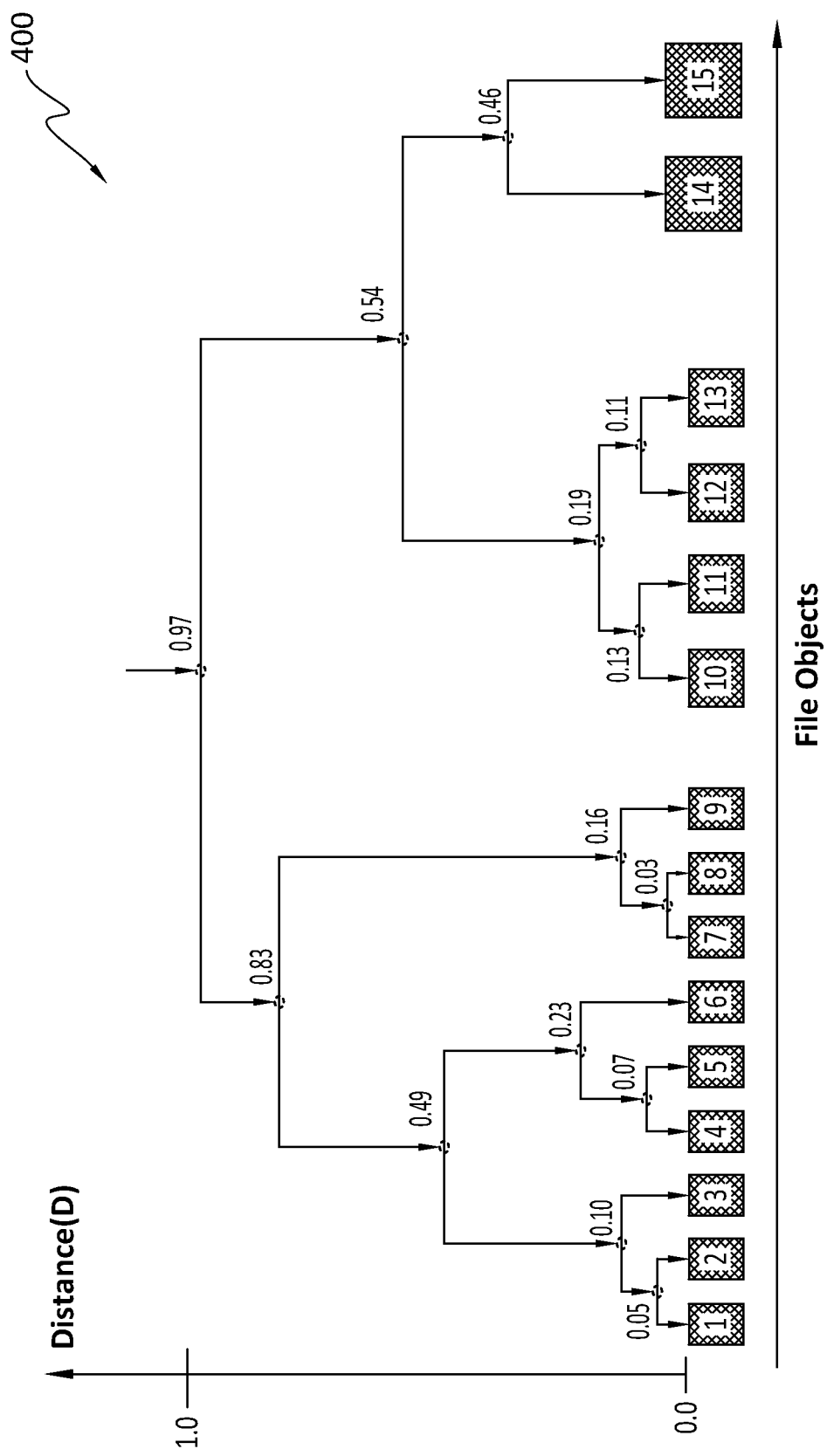
FIG. 4 discloses an example dendrogram with 15 file objects.

The distance function of two files X and Y is just the compliment of the similarity $D(X,Y)=1-J(X,Y)$. Thus, in the preceding illustrative example where $J(X,Y)=0.25$, $D(X,Y)=1-0.25$, or $D(X,Y)=0.75$. Thus, a distance 'D' of 0 indicates that the files X and Y are exact duplicates, and a distance 'D' of 1 indicates that the files X and Y share no common data and are completely dissimilar. FIG. 4 shows the distances at which the clusters are combined. For example, clusters 1 and 2 are combined together at a distance of 0.05. The cluster formed by the combination of clusters 1 and 2 is combined together with cluster 3 at a distance of 0.1.

Given the clustering results in the example of FIG. 4, it is not readily apparent how to identify the "best clusters" from the hierarchical structure shown there. In light of this, example embodiments are directed to an automatic sub-cluster selection algorithm that may operate to identify particular clusters, having desired properties, from a set of hierarchical clustering results.

C.2 W-Index

The W-index is inspired by the Dunn Index, which may be used to evaluate a clustering algorithm, specifically, the results produced by a clustering algorithm. The Dunn Index=min (inter-cluster distance)/max (intra-cluster diameter). The Dunn Index may be computed at each iteration of a hierarchical clustering algorithm, and the cluster solution is chosen when the Dunn Index is a maximum. This approach will always produce one cluster solution where the clusters are well separated with compact cluster sizes. The above formula for the Dunn Index can be easily computed if the objects are N-dimensional vectors. Particularly, the distance between 2 vectors is simply the Euclidean space distance. However, for file objects, the corresponding SHA1 fingerprints are not objects in the Euclidean space and, thus, the Dunn Index is not well defined in this object space. So, for file objects, a more relevant index, the W-index, may be defined.

In particular, the W-index $W_k$ for each iteration k is defined to be $D_{k+1}/D_k$ where $D_k$ is the distance between 2 of the chosen objects that were combined with each other at iteration k. If $D_k$ is zero, the W-index is undefined. Thus, $W_k$=(inter-cluster distance)/(intra-cluster diameter)=$D_{k+1}/D_k$.

Since the distance measure is not defined for the SHA1 fingerprints, the intra-cluster diameter has to be defined with respect to the objects that form the cluster. Since the clusters are formed by combining the most similar objects first, their corresponding distances are increasing. $D_k >= D_{k-1} >= \ldots >= D_1$. $D_k$ is the largest distance among the objects that form the cluster at the k-th iteration. Therefore, $D_k$ represents the intra-cluster diameter. The next closest distance among all the remaining objects at the k-th iteration is $D_{k+1}$. Therefore, $D_{k+1}$ is the inter-cluster distance at the k-th iteration. In these scenarios, the "best" cluster solution is the one formed at the k-th iteration where $W_k$ is maximum. At the k-th iteration, the algorithm has partitioned the N file objects into N−k groups of similar files and the solution is the "best" because: (i) all the clusters are well separated (inter-cluster distance may be relatively large); and (ii) the clusters sizes are compact (intra-cluster diameter may be relatively small). Note that the W-index may be computed easily from the dendrogram data.

C.3 Algorithm to Select Sub-Clusters from Hierarchical Clustering Results

As noted elsewhere herein, example embodiments embrace, among other things, algorithms which are executable to select sub-clusters from hierarchical clustering results such as may be generated by the example HC algorithms disclosed herein. At least some example embodiments of a sub-cluster selection (SCS) algorithm may proceed as follows:

(1) starting from the root node of an Mtree, or other data structure;
(2) calculate W-Index for the parent node and the left child, thus $W_{P-L}=D_{parent}/D_{left\ child}$;
(3) calculate W-Index for the parent node and the right child, thus $W_{P-R}=D_{parent}/D_{right\ child}$;
(4) a large W-index indicates that the child node is far apart and should be considered a sub-cluster on its own—on the other hand, a small W-index indicates that the child node is close to its parent node and should be kept in the same cluster as the parent node—so, mark the child node a cluster candidate if the W-index is greater than λ (the threshold λ is discussed below); and,
(5) continue the process and move down the branch recursively until all the sub-clusters are revealed—one or more sub-clusters may then be selected.

Figure 5:
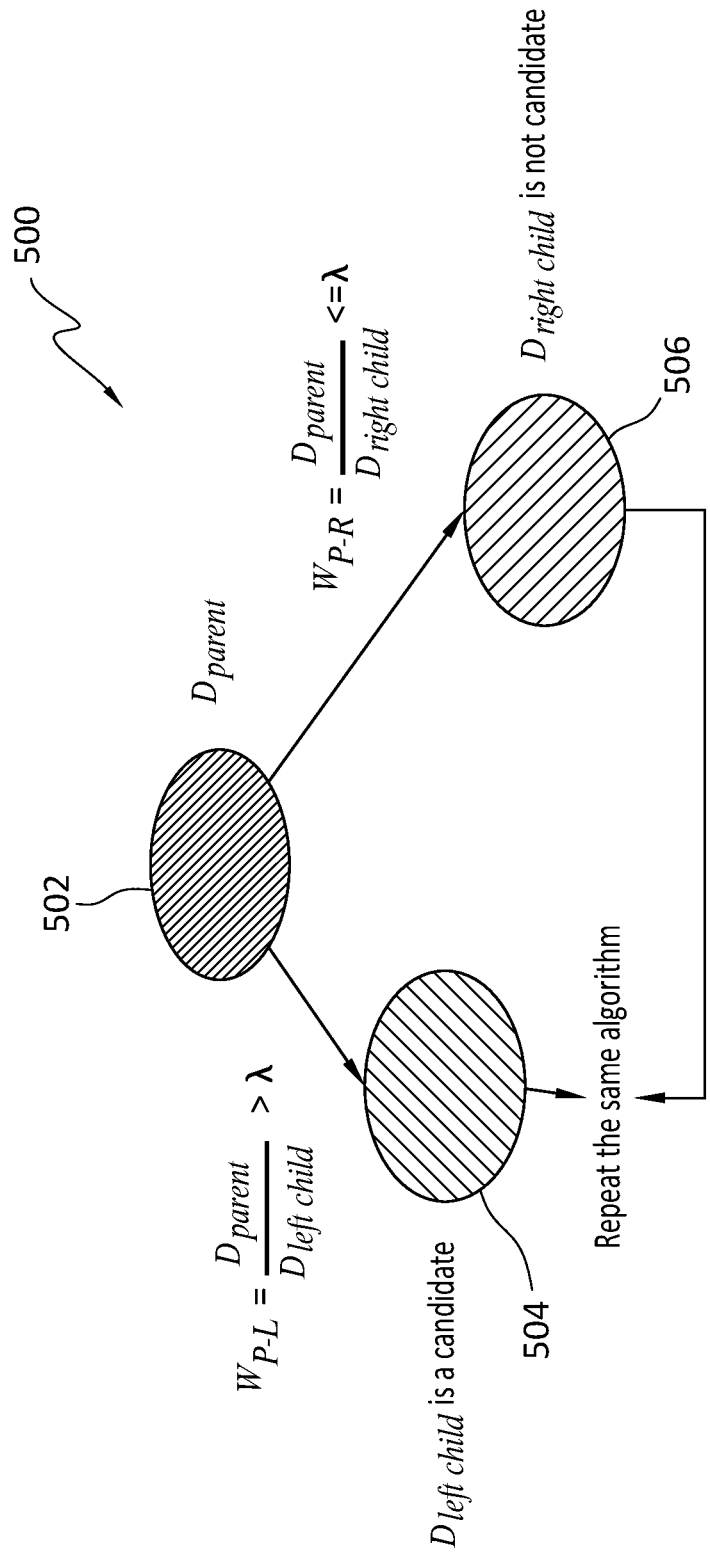
FIG. 5 discloses an implementation of an algorithm according to some example embodiments.

An example partial outcome of an algorithm such as that just described is disclosed in FIG. 5. In particular, a data structure 500, such as an Mtree for example, may include a parent node 502, which may or may not be a root node of the data structure 500. The parent node 502 may have two child nodes, namely, a left child node 504, and a right child node 506, one or both of which may, or may not, be potential candidates for combination with the parent node 502.

As shown in FIG. 5, an SCS algorithm according to some example embodiments may determine that the W-index for nodes 502 and 504 is less than, or equal to, the threshold λ. As such, the node 504 is not a candidate for inclusion in a cluster with the node 502. The SCS algorithm may further determine that the W-index for nodes 502 and 506 is greater than the threshold λ. As such, the node 506 is a candidate for inclusion in a cluster together with the node 502. Note that the 'D' values referred to in FIG. 5 may be obtained, for example, from a dendrogram such as the dendrogram 400 disclosed in FIG. 4. Note that while reference may be made in this disclosure to combining nodes, it is the file object(s) at those nodes that are combined together, or not combined together, as the case may be.

Finally, as shown in FIG. 5, after a determination is made that node 506 is a candidate, the same parent/right child/left child analysis may be performed again, with the node 504 as the parent for one iteration, and the node 506 as the parent for another iteration. Thus, the process shown in FIG. 5 may be performed recursively until all the nodes of a data structure, or data structure representation, have been traversed, and all sub-clusters identified.

C.4 Threshold λ Selection

Figure 6B:
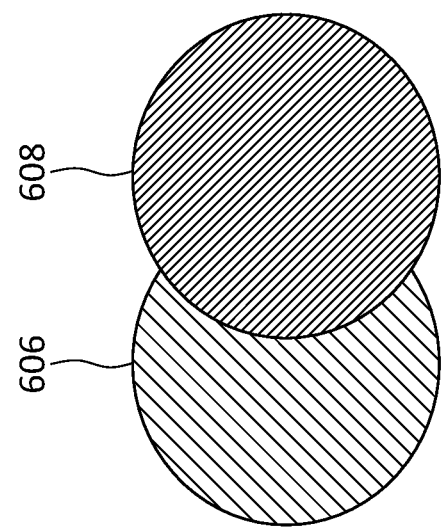
FIGS. 6a and 6b disclose different respective results obtained based on a particular threshold $\lambda$.
Figure 6A:
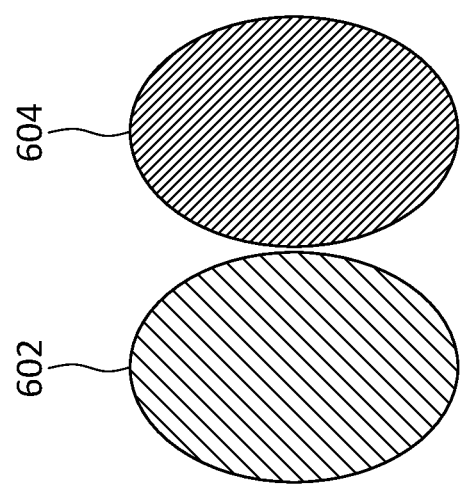

As noted above, and with reference now to FIGS. 6a and 6b, a threshold λ may be used to determine whether or not a child node should be included in the same cluster as its parent. The value of "X" may be dependent on the distance metric and may be chosen based on the application, or may be determined empirically. Consider, for example, a dendrogram based on the distance function: d=−log (similarity), and suppose that the combined object, or parent, formed by the combination of parent cluster 602 and child cluster 604 is much bigger than the cluster (parent) 602 was prior to combination. In this case, $D_{parent}/D_{child} > 2$, which indicates, in FIG. 6a, that the child and parent clusters, 604 and 602 respectively, are well separated from each other. In the example of FIG. 6b, the combined object (parent) is about the same size as the parent was before the parent cluster 606 and child cluster 608 were combined and, thus, there is little separation between the parent cluster 606 and the child cluster 608, that is, $D_{parent}/D_{child} < 2$. This indicates that a value of 2 is good for λ in this case, since the value of 2 means that the clusters are separate from each other, as shown in FIG. 6a.

C.5 Application of Algorithm to Dendrogram, with λ=2

Figure 7:
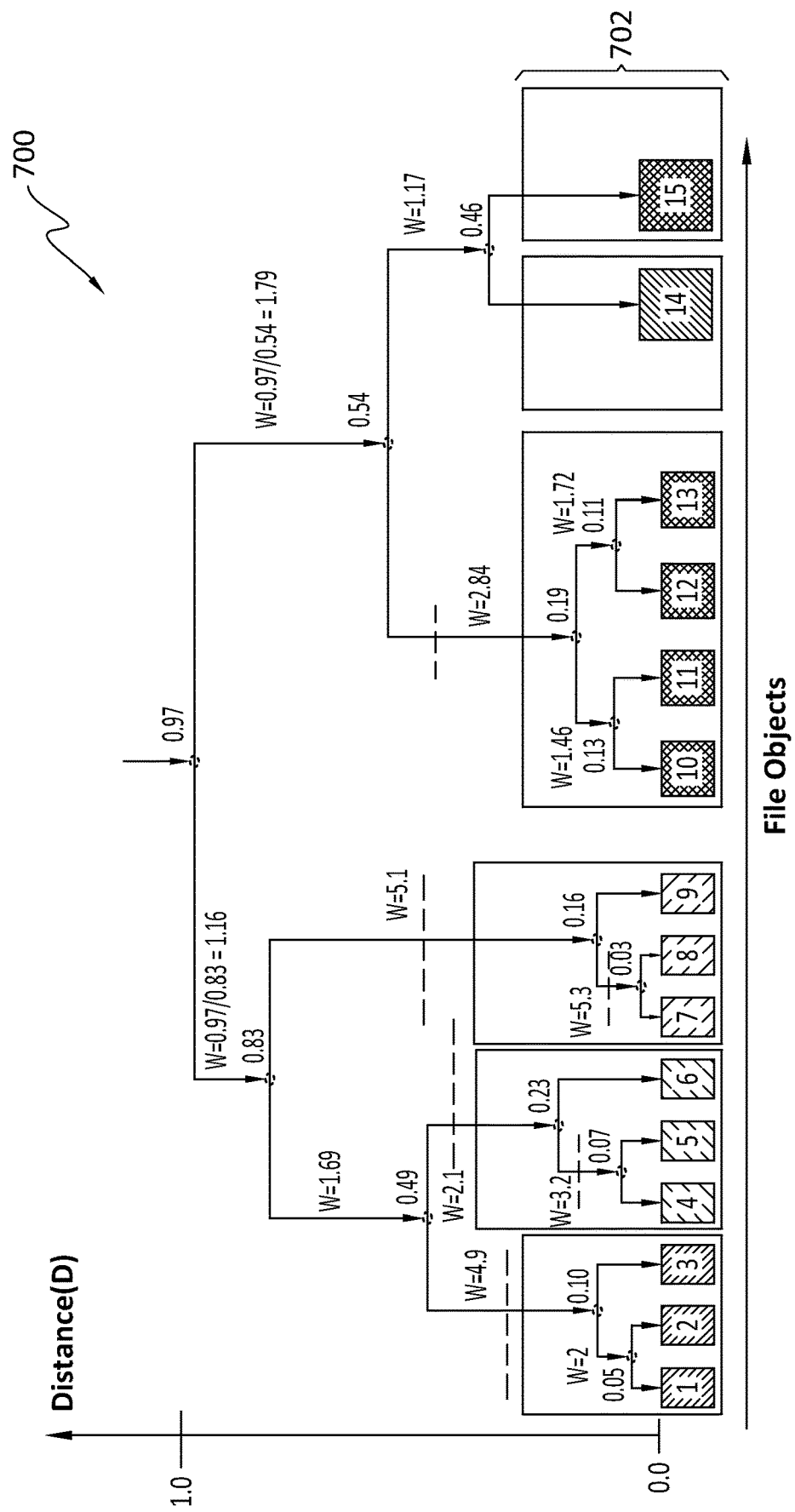
FIG. 7 discloses an example of sub-cluster selection using an algorithm according to some example embodiments.

By applying the example algorithm of part C.3 to the dendrogram in FIG. 4, and λ=2, the solution shown in FIG. 7 may be obtained. In particular, in the dendrogram 700, the following six sub-clusters 702 of file objects are indicated: [1,2,3], [[4,5],6], [[7,8],9], [10,11,12,13], [14], and [15]. The recursive approach employed by example embodiments of the algorithm may allow further sub-clustering, such as sub-cluster [4,5,6] into [4,5], and [7,8,9] into [7,8]. In this way, some of the sub-clusters 702 may be broken down further into sub-clusters which are more cohesive. More particularly, and continuing with the example of FIG. 7, [4] and [5] are more similar to each other than to [6] and, as such, [4] and [5] are clustered together (with a W of 0.07) as [4,5] separately from [6], which may now be its own sub-cluster, instead of being combined with [4] and [5] for an overall W of 3.2. In contrast, the W value 1.46 for [10,11] may be close enough to the W value 1.72 for [12,13] that those four objects may remained clustered together. As indicated by the broken lines in FIG. 7, embodiments of the invention may implement sub-clustering at any, and multiple, level(s) in a dendrogram.

D. Further Discussion

As will be apparent from this disclosure, example embodiments within the scope of the invention, including the disclosed algorithms, may provide a variety of useful features and advantages. For example, an embodiment of the sub-cluster selection (SCS) algorithm may operate to discover the sub-clusters over the entire hierarchical structure of a group of data structures, such as a group of Mtrees for example. An embodiment may be useful in applications such big data management, data migration, and data storage capacity balancing. An embodiment may enable data analysis to obtain insights into related data. Finally, an embodiment may implement sub-cluster(s) selection by optimizing the selection based on application specific parameters such as, but not limited to, data movement cost, deduplication savings at the destination, and available storage space at the destination.

E. Comparative Examples

With reference briefly now to FIGS. 8-12, various examples are provided that illustrate distinctions between embodiments of the invention and alternative approaches. As noted elsewhere herein, other algorithms that may be used to cluster data suffer from a common problem. Namely, the cluster selection implemented by those algorithms is based on a global condition and cuts of the dendrogram at a single pre-defined similarity level either by visual inspection using a predefined threshold such as the number of clusters required, or automatically based on maximum gap or W-index.

E.1 Pre-Defined Cluster Similarity Level

Figure 8:
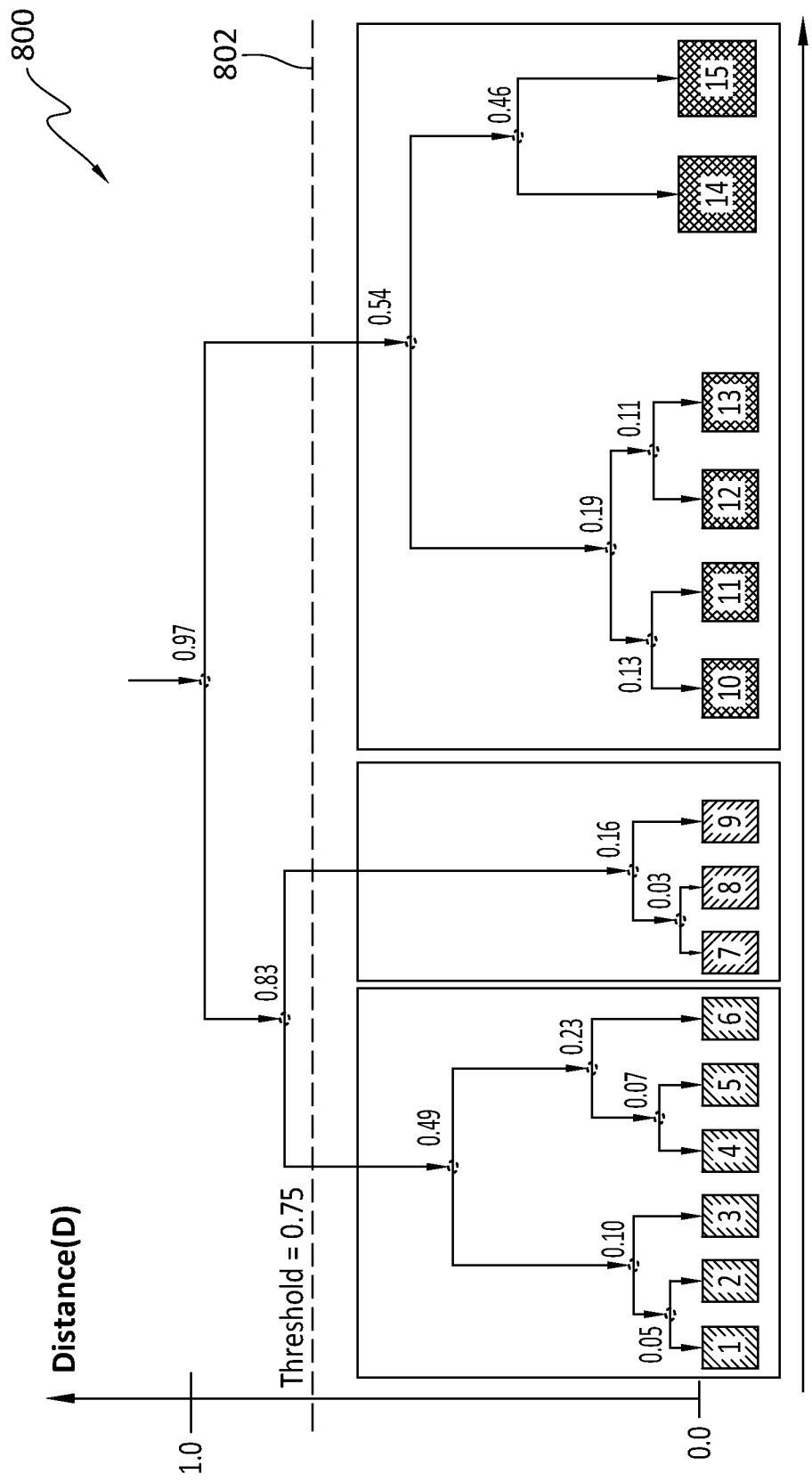
FIG. 8 discloses an example of sub-cluster selection by similarity threshold.

With reference to the example dendrogram 800 of FIG. 8, for implementation of selection by similarity level, an arbitrary similarity threshold of 0.75 has been chosen to divide the dendrogram 800. The same threshold may work for some workloads, but not for others. In FIG. 8, the broken line 802 represents the solution given by the similarity threshold, or distance 'D,'=0.75. The resulting sub-clusters selected are [1,2,3,4,5,6], [7,8,9], and [10,11,12,13,14,15]. Note that by requiring a single similarity threshold for all the clusters, a relatively high threshold, indicating relatively low similarity, must be chosen. Recall that a similarity, or 'D,' of 1.0 means that at least as between a pair of files, there is no similarity, while a 'D' of 0 indicates the files are identical.

E.2 Predetermined Number of Desired Clusters

Figure 9:
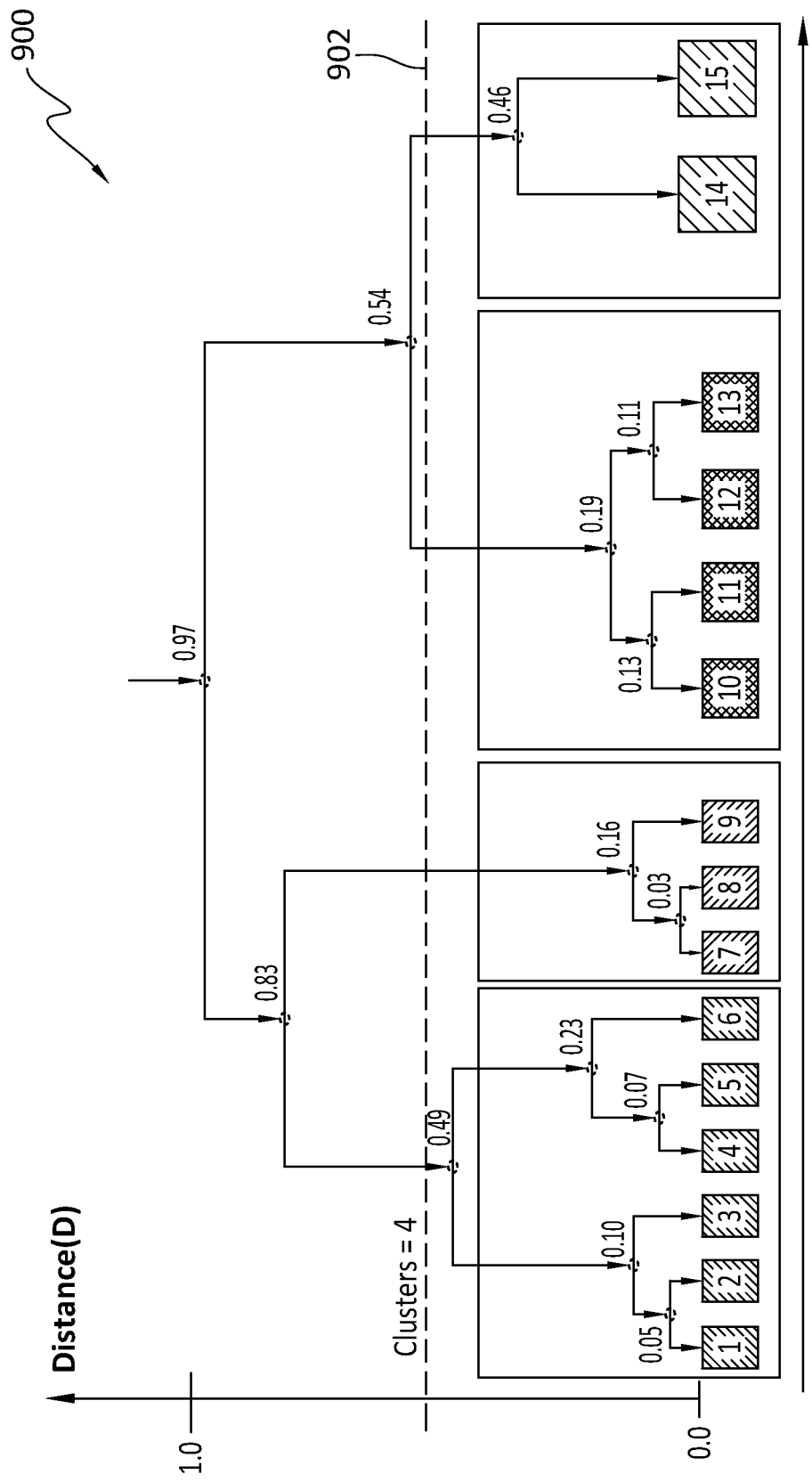
FIG. 9 discloses an example of sub-cluster selection by specifying a number of sub-clusters.

Turning next to the dendrogram 900 of FIG. 9, another approach might be to simply specify a predetermined number 'N' of clusters desired for a particular application. In the example of FIG. 9, N=4. For the N clusters, the similarity threshold at which the dataset is divided into N may be selected. In FIG. 9, the broken line 902 represents the solution obtained when the number of clusters is set=4, and the clusters formed are [1,2,3,4,5,6], [7,8,9], [10,11,12,13], and [14,15]. As should be apparent from this example, human inspection of the dendrogram 900 would be needed to make the decision for selecting a "good" or "optimal" similarity threshold or a "good" or "optimal" value of "N."

E.3 Maximum Gap Selection Approach

Figure 10:
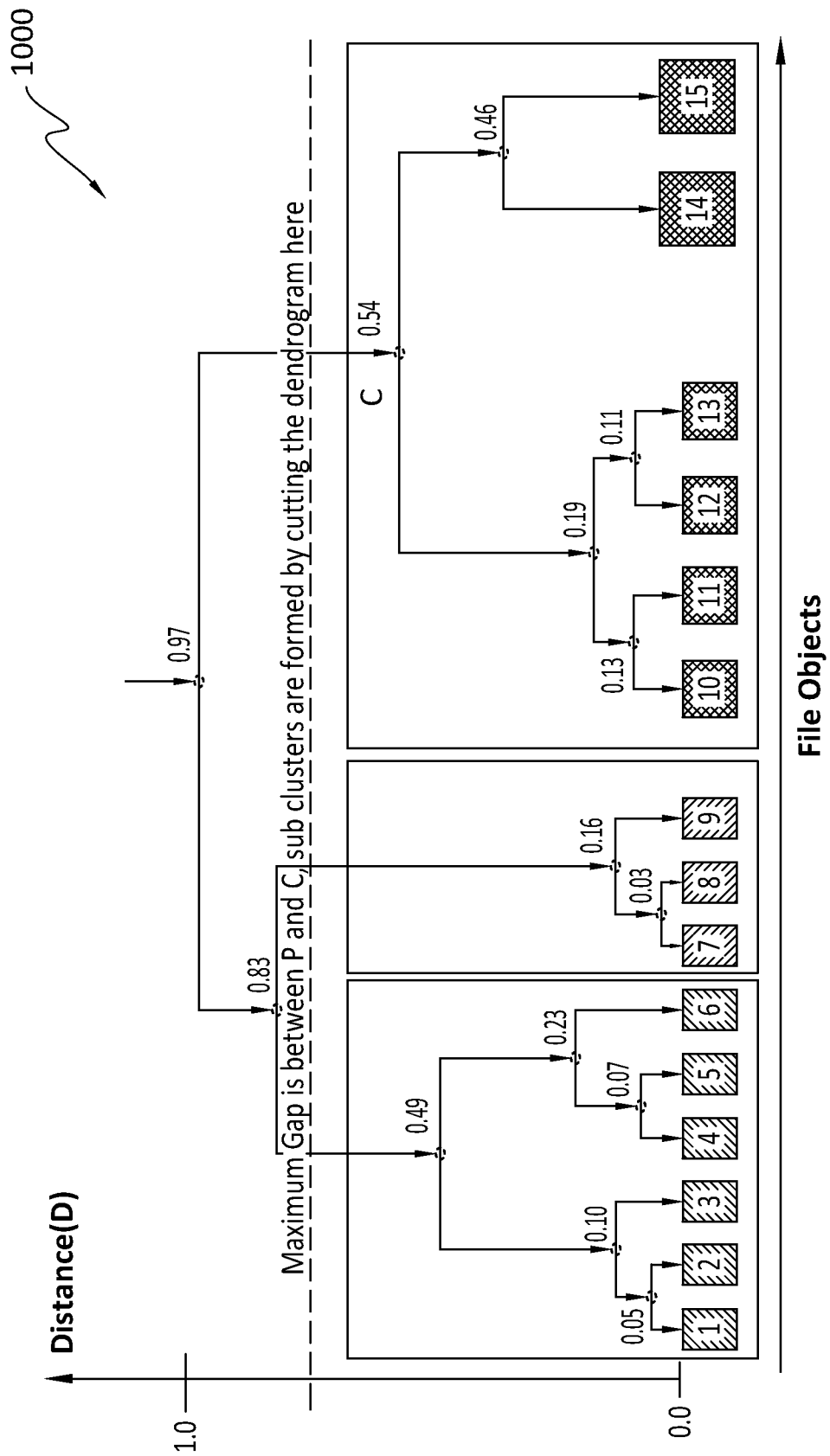
FIG. 10 discloses an example of sub-clusters defined using a max-gap selection algorithm.
Figure 12:
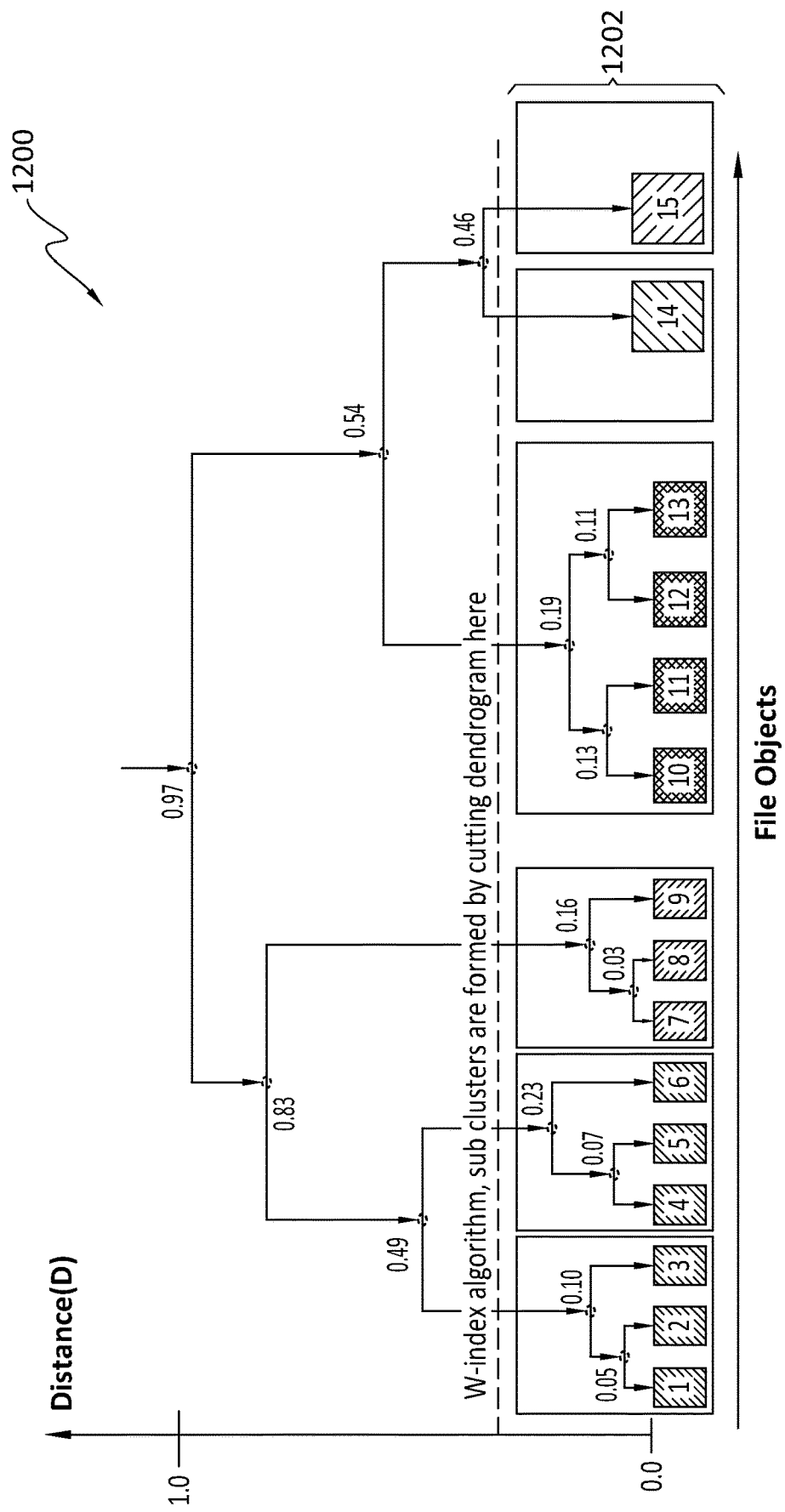
FIG. 12 discloses an example of the use of a W-index algorithm to select sub-clusters.

With reference now to the dendrogram 1000 of FIG. 10, still another approach that might be employed may be to form clusters using a max-gap selection algorithm. In this approach, a maximum gap algorithm selects the solution based on an optimal condition, namely, the maximum gap or distance between parent and child. This approach may automatically generate the result from the dendrogram 1000 without user intervention. It can be seen in FIG. 10 that the result obtained with this approach will yield the same result as the similarity threshold approach disclosed in FIG. 9. Thus, the results obtained with the maximum gap selection approach are not particularly valuable.

E.4 W-Index: Bottom-Up Approach

Instead of the maximum gap condition, the W-index bottom-up approach looks for the maximum ratio of the inter-cluster distance and the intra-cluster distance. It is thus animated by the Dunn index algorithm. In the W-index selection algorithm, $W_k$ for each clustering iteration k is $D_{k+1}/D_k$, where $D_k$ is the distance of the 2 chosen objects combined at iteration k. The optimal cluster solution using this method is the one formed at the k-th iteration where $W_k$ is maximum. At the k-th iteration, the algorithm has partitioned the N file objects into N−k groups of similar files and the solution is the "best" because all the clusters are well separated (inter-cluster distance) and the clusters sizes are compact (intra-cluster diameter).

With reference now to FIG. 11, this W-index bottom-up approach may proceed with the algorithm 1100 performing a W-index calculation for each clustering iteration. Particularly, the algorithm 1100 may proceed by calculating $W_k = D_{k+1}/D_k$ for every k-iteration of clustering. For example, $W_6 = D_7/D_6 = 0.16/0.13 = 1.23$. Similarly, $W_9 = D_{10}/D_9 = 0.46/0.23 = 2$ This may be calculated for every iteration and the maximum $W_k$ found. Here max is at $W_9 = 2$. Thus, as shown in the dendrogram 1200 of FIG. 12, this algorithm 1100 identifies and lists the sub-clusters 1202 formed at W-index=2.

F. Example Methods

Figure 13:
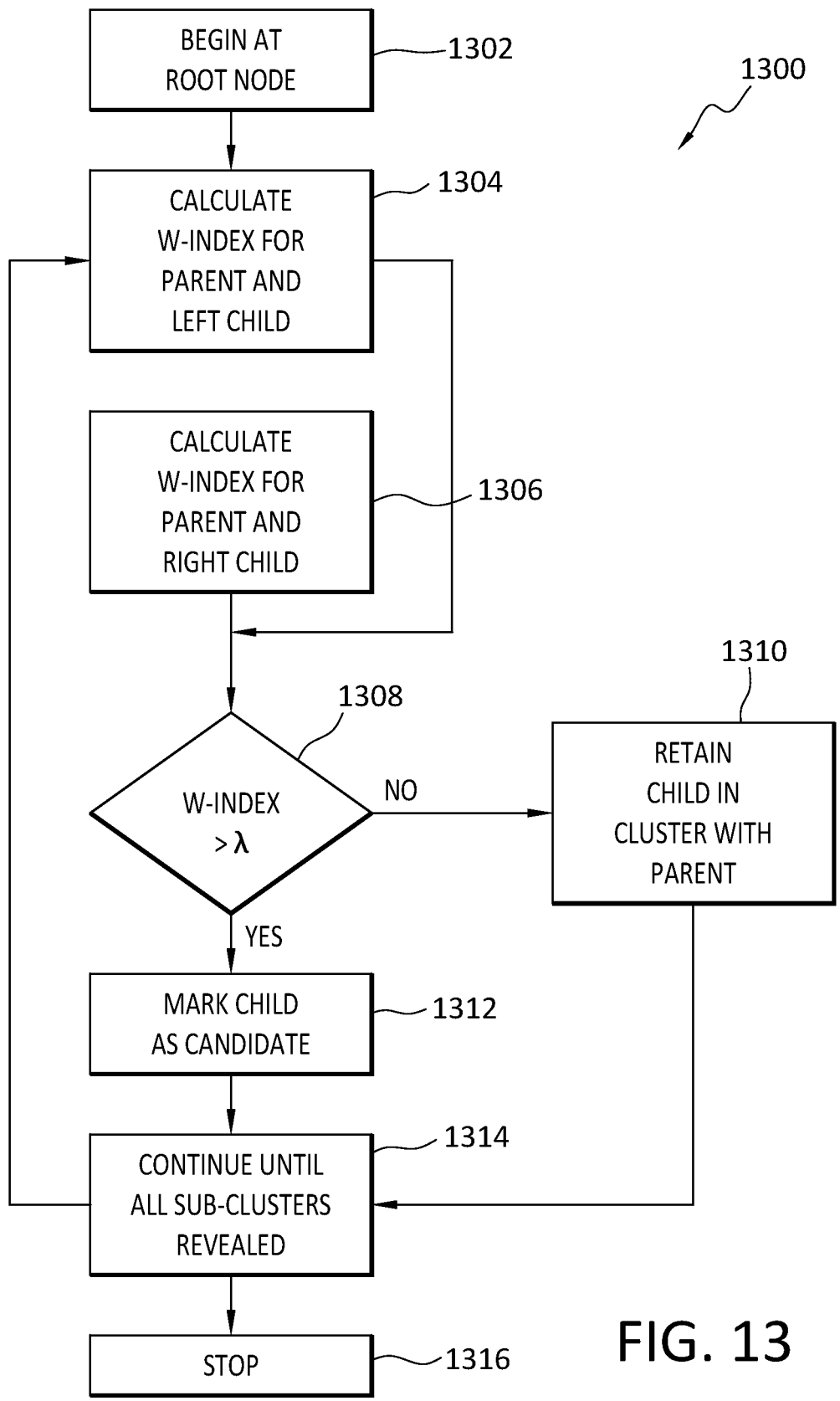
FIG. 13 discloses an example method according to some embodiments.

It is noted with respect to the disclosed methods, including the example method of FIG. 13, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 13, the example method 1300 may be performed on hierarchical clustering results, in the form of the structure of an Mtree for example, presented in a dendrogram. The method 1300 may identify, and select, sub-clusters from those clustering results. The selected sub-clusters may be at any level, and multiple levels, in the hierarchy that is visually presented in the dendrogram. In some embodiments, the method 1300 may be performed by, or at the direction of, a deduplication server, but that is not necessarily required.

The method 1300 may begin 1302 at a root node of a data structure such as an Mtree. At 1304, a W-index may be calculated for the parent node, which is the root node in the initial iteration of the method 1300, and the left child of the parent node. Next, a W-index may be calculated for the parent node and the right child of the parent node. If a W-index is determined 1308 to be greater than a threshold λ, then the corresponding child node may be marked as a cluster candidate 1312, that is, a candidate to be in a cluster separate from the parent. On the other hand, if a W-index is determined 1308 to be less than, or equal to, the threshold λ, then the corresponding child node may be kept in the same cluster as the parent 1310.

The processes 1304-1312 may be performed recursively until all sub-clusters, in the hierarchical clustering results of the dendrogram, have been revealed 1314. At this point, the method 1300 may then stop 1316. Various processes may be performed after the sub-clusters have been identified 1314. For example, data deduplication may be performed on the file objects included in the various sub-clusters. Note that the method 1300 may proceed automatically without any input or involvement by a user except, possibly, the specification of a value for the threshold λ to guide the sub-cluster identification process.

G. Further Example Embodiments

Following are some further example embodiments of the invention. These are presented only by way of example and are not intended to limit the scope of the invention in any way.

Embodiment 1. A method, comprising: beginning at a parent node of a data structure, calculating a first W-index for the parent node and a left child node; calculating a second W-index for the parent node and a right child node; when the first W-index exceeds a threshold λ, marking the left child node as a candidate to be included in a sub-cluster separate from a sub-cluster that includes the parent node; when the second W-index exceeds the threshold λ, marking the right child node as a candidate to be included in a sub-cluster separate from the sub-cluster that includes the parent node; and recursively calculating respective W-indices for all other parent nodes in the data structure until all child nodes of the data structure have been assigned to a sub-cluster.

Embodiment 2. The method as recited in embodiment 1, wherein the parent node is a root node of the data structure.

Embodiment 3. The method as recited in any of embodiments 1-2, wherein each of the sub-clusters comprises one or more file objects.

Embodiment 4. The method as recited in any of embodiments 1-3, wherein a first one of the sub-clusters is positioned, in a similarity hierarchy of a dendrogram, at a different level and/or different branch from a level and/or branch, respectively, at which a second one of the sub-clusters is positioned.

Embodiment 5. The method as recited in any of embodiments 1-4, wherein all file objects in one of the sub-clusters have at least a minimum similarity with respect to each other.

Embodiment 6. The method as recited in any of embodiments 1-5, wherein the data structure comprises hierarchical clustering results generated by a hierarchical clustering algorithm.

Embodiment 7. The method as recited in any of embodiments 1-6, further comprising deduplicating file objects included in one of the sub-clusters.

Embodiment 8. The method as recited in any of embodiments 1-7, wherein one or more of the sub-clusters are selectable by an application, based on one or more criteria specified by the application.

Embodiment 9. The method as recited in any of embodiments 1-8, wherein inclusion of a file object in a sub-cluster is based on a Jaccard coefficient of that file object with respect to another file object.

Embodiment 10. The method as recited in any of embodiments 1-9, wherein when the first W-index or the second W-index is less than, or equal to, the threshold λ, the respective child node associated with the first W-index or the second W-index is retained in a same sub-cluster as the parent node.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 14:
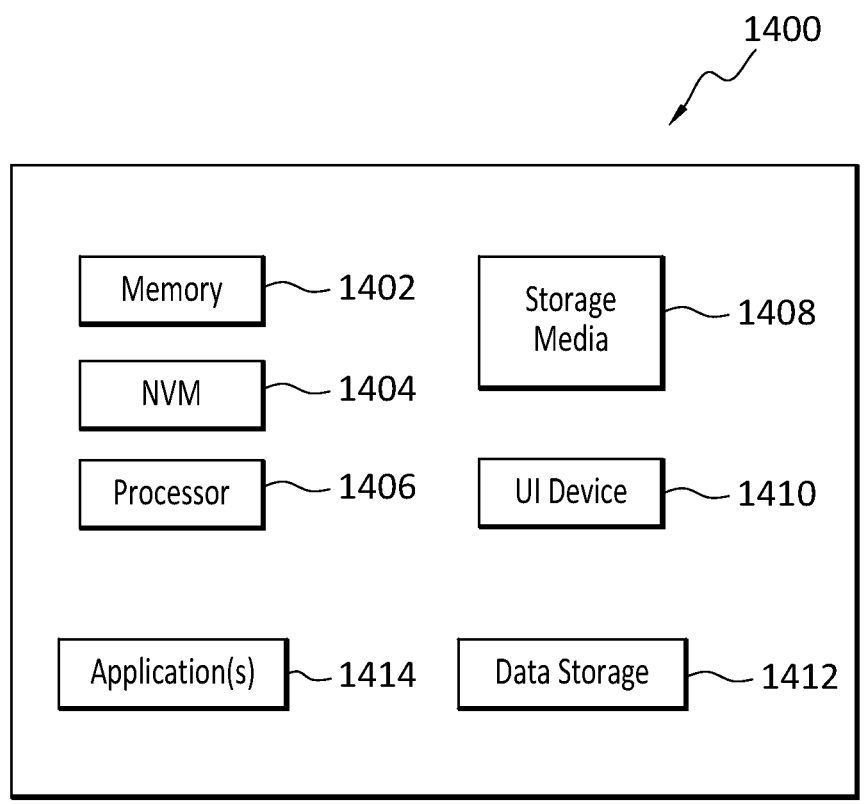
FIG. 14 discloses aspects of an example computing entity operable to perform any of the disclosed methods, processes, and operations.

With reference briefly now to FIG. 14, any one or more of the entities disclosed, or implied, by FIGS. 1-13 and/or elsewhere herein, may take the form of, or include, or be implemented on, or hosted by, a physical computing device, one example of which is denoted at 1400. As well, where any of the aforementioned elements comprise or consist of a virtual machine (VM), that VM may constitute a virtualization of any combination of the physical components disclosed in FIG. 14.

In the example of FIG. 14, the physical computing device 1400 includes memory 1402 which may include one, some, or all, of random access memory (RAM), non-volatile memory (NVM) 1404 such as NVRAM for example, read-only memory (ROM), and persistent memory, one or more hardware processors 1406, non-transitory storage media 1408, UI (user interface) device 1410, and data storage 1412. One or more of the memory components 1402 of the physical computing device 1400 may take the form of solid state device (SSD) storage. As well, one or more applications 1414 may be provided that comprise instructions executable by one or more hardware processors 1406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes

What is claimed is:

1. A method, comprising:

beginning at a parent node of a dendrogram, calculating a first W-index for the parent node and a left child node, wherein lowest nodes of the dendrogram are file objects, each node in the dendrogram has a respective distance measure in a descending order from the parent node to child nodes, and the first W-index is a ratio obtained by dividing a distance measure of the parent node by a distance measure of the left child node;

calculating a second W-index for the parent node and a right child node, where in the second W-index is a ratio obtained by dividing the distance measure of the parent node by a distance measure of the right child node;

when the first W-index exceeds a threshold, marking file objects located under the left child node in the dendrogram as a candidate to be included in a sub-cluster separate from a sub-cluster that includes the parent node;

when the second W-index exceeds the threshold, marking file objects located under the right child node in the dendrogram as a candidate to be included in a sub-cluster separate from the sub-cluster that includes the parent node;

recursively calculating respective W-indices for all other parent nodes in the data structure until all child nodes of the data structure, of which the respective W-indices exceed the threshold, have been assigned to a sub-cluster; and sub-clustering all nodes in the dendrogram based on the threshold.

2. The method as recited in claim 1, wherein the parent node is a root node of the data structure.

3. The method as recited in claim 1, wherein each of the sub-clusters comprises one or more file objects.

4. The method as recited in claim 1, wherein a first one of the sub-clusters is positioned, in a similarity hierarchy of the dendrogram, at a level or branch different from a level or branch, respectively, at which a second one of the sub-clusters is positioned.

5. The method as recited in claim 1, wherein all file objects in one of the sub-clusters have at least a minimum similarity with respect to each other.

6. The method as recited in claim 1, wherein the data structure comprises hierarchical clustering results generated by a hierarchical clustering algorithm.

7. The method as recited in claim 1, further comprising deduplicating file objects included in one of the sub-clusters.

8. The method as recited in claim 1, wherein one or more of the sub-clusters are selectable by an application, based on one or more criteria specified by the application.

9. The method as recited in claim 1, wherein inclusion of a file object in a sub-cluster is based on a Jaccard coefficient of that file object with respect to another file object.

10. The method as recited in claim 1, wherein when the first W-index or the second W-index is less than, or equal to, the threshold, the respective child node associated with the first W-index or the second W-index is retained in a same sub-cluster as the parent node.

11. A non-transitory storage medium having stored therein instructions that are executable by one or more hardware processors to perform operations comprising:

beginning at a parent node of a dendrogram, calculating a first W-index for the parent node and a left child node, wherein lowest nodes of the dendrogram are file objects, each node in the dendrogram has a respective distance measure in a descending order from the parent node to child nodes, and the first W-index is a ratio obtained by dividing a distance measure of the parent node by a distance measure of the left child node;

calculating a second W-index for the parent node and a right child node, where in the second W-index is a ratio obtained by dividing the distance measure of the parent node by a distance measure of the right child node;

when the first W-index exceeds a threshold, marking file objects located under the left child node in the dendrogram as a candidate to be included in a sub-cluster separate from a sub-cluster that includes the parent node;

when the second W-index exceeds the threshold, marking file objects located under the right child node in the dendrogram as a candidate to be included in a sub-cluster separate from the sub-cluster that includes the parent node;

recursively calculating respective W-indices for all other parent nodes in the data structure until all child nodes of the data structure have been assigned to a sub-cluster; and sub-clustering all nodes in the dendrogram based on the threshold.

12. The non-transitory storage medium as recited in claim 11, wherein the parent node is a root node of the data structure.

13. The non-transitory storage medium as recited in claim 11, wherein each of the sub-clusters comprises one or more file objects.

14. The non-transitory storage medium as recited in claim 11, wherein a first one of the sub-clusters is positioned, in a similarity hierarchy of the dendrogram, at a level or branch different from a level or branch, respectively, at which a second one of the sub-clusters is positioned.

15. The non-transitory storage medium as recited in claim 11, wherein all file objects in one of the sub-clusters have at least a minimum similarity with respect to each other.

16. The non-transitory storage medium as recited in claim 11, wherein the data structure comprises hierarchical clustering results generated by a hierarchical clustering algorithm.

17. The non-transitory storage medium as recited in claim 11, wherein the operations further comprise deduplicating file objects included in one of the sub-clusters.

18. The non-transitory storage medium as recited in claim 11, wherein one or more of the sub-clusters are selectable by an application, based on one or more criteria specified by the application.

19. The non-transitory storage medium as recited in claim 11, wherein inclusion of a file object in a sub-cluster is based on a Jaccard coefficient of that file object with respect to another file object.

20. The non-transitory storage medium as recited in claim 11, wherein when the first W-index or the second W-index is less than, or equal to, the threshold, the respective child node associated with the first W-index or the second W-index is retained in a same sub-cluster as the parent node.

* * * * *